United States Patent [19]

Seng et al.

[11] Patent Number: 4,819,247
[45] Date of Patent: Apr. 4, 1989

[54] GLASS MELT FURNACE

[75] Inventors: Stephen Seng, Frazeysburg; Frank J. Macdonald, Granville, both of Ohio

[73] Assignee: Owens-Corning Fiberglas Corporation, Toledo, Ohio

[21] Appl. No.: 116,171

[22] Filed: Nov. 3, 1987

[51] Int. Cl.$^4$ .............................................. C03B 5/027
[52] U.S. Cl. ...................................................... 373/30
[58] Field of Search ....................... 373/28, 30, 35, 33, 373/32

[56] References Cited

U.S. PATENT DOCUMENTS

| | | | |
|---|---|---|---|
| 2,913,509 | 11/1959 | Pinotti | 373/35 |
| 4,366,571 | 12/1982 | Palmquist | 373/30 |
| 4,399,544 | 8/1983 | Monaghan | 373/35 |
| 4,491,951 | 1/1985 | Dunn | 373/30 |

Primary Examiner—Roy N. Envall, Jr.
Attorney, Agent, or Firm—Patrick P. Pacella; Ronald E. Champion

[57] ABSTRACT

The improved joule effect glass melt apparatus and method of using the apparatus delivers isothermal glass to a glass forming bushing and reduces the erosion of refractory at high melt temperatures by isolating the refractory from joule effect currents. The glass melt apparatus uses molybdenum liners located on the side walls of the molten glass receptacle to receive joule effect current and provide a uniform temperature distribution through the glass. A molybdenum flow block and molybdenum heat sink located in the flow block complete the heat distribution in the molten glass, achieving an essentially isothermal cross section molten glass upon arrival at the glass forming apparatus or bushing.

29 Claims, 6 Drawing Sheets

GLASS MELT FURNACE

BACKGROUND OF THE INVENTION

This invention relates to an improved electric furnace apparatus for use in the high temperature melting of glass. Specifically, the invention provides a method and apparatus designed to accomplish the efficient joule heating of molten glass. The electric heating of molten glass conventionally provides for a molten glass receptacle in which raw glass batch is heated and melted. The receptacle is lined with refractory. Heating electrodes, usually of opposed polarity, are immersed in the molten glass. Most commonly, the electrodes project through the refractory side walls or the refractory lined bottom of the molten glass receptacle. Since the electrodes are of opposed polarity, an electrical firing pattern is devised to provide electrical current between sets of electrodes of opposed polarity thereby raising or maintaining the temperature of the molten glass by means of joule electrical heating.

Many different electrode arrangements have been utilized, such as those shown in U.S. Pat. Nos. 4,528,013, 3,757,020 and 3,392,237. The one common factor in all electrode arrangements in joule glass melting furnaces lies in the factor that the electrodes are of opposite polarity in order to effect the joule current through the molten glass. A common goal is to achieve uniform temperature gradients throughout the molten glass and eliminate unwanted seeds, stones and cords. The large variety of prior art electrode arrangements indicate that it is difficult to achieve these desired goals with consistent results.

Another common problem regularly addressed by the large number of differing prior art electric furnace melters is that the glass melt receptacle must be constructed of a durable refractory which is less conductive to electric current than the molten glass. In other words, expressed in terms of electrical resistivity, the effective electrical resistivity of the refractory must be sufficient relative to the resistivity of the molten glass at the operative temperature of the glass heating to avoid any appreciable short circuiting of the heating current through the refractory rather than through the molten glass. With increasing temperature and glass fluidity, common refractory used in most furnaces becomes increasingly susceptible to being dissolved and corroded. As the refractory dissolves, many of the corrosive products are swept into the molten glass bath. The dissolved refractory materials become part of the glass composition and in some cases may have a deleterious effect on glass quality. Also, it is obvious that corrosion of the refractory leads to unwanted shutdown time and expense in repairing the corroded surfaces.

Many attempts to reduce the rate of corrosion or eliminate corrosion of the refractory are evident. For instance, U.S. Pat. No. 4,491,951 discloses a method and apparatus for cooling the refractory of the glass melt receptacle to increase the electrical resistivity of the refractory, thereby reducing the tendency of the refractory to short circuit and corrode. U.S. Pat. No. 4,366,571 discloses the use of a protective metal liner constructed of platinum or molybdenum to protect the refractory surface. U.S. Pat. No. 4,618,962 also discloses the use of a refractory metal liner such as molybdenum. A common goal of the prior art liner patents is the recognized desirability of avoiding electrical current charging to the metal liner from the electrodes. For instance, U.S. Pat. No. 4,618,962 avoids the use of electrodes inserted through the refractory and molybdenum lining since the lining would short circuit. To avoid the use of electrodes, U.S. Pat. No. 4,618,962 patent positions resistance heaters between the refractory and the lining to provide heat to the glass melt. U.S. Pat. No. 4,366,571 avoids the insertion of electrodes through the metal lining and instead, provides a variety of electrode arrangements wherein the electrodes are through-the-batch and floor electrodes, leaving the metal lining to the walls of the glass melt receptable.

Other attempts to avoid the declining electrical resistivity problem of refractory at high melt temperatures have involved building the furnace from highly resistive refractories such as zircon or zirconia. However, most refractories appear to have inversely proportional properties of electrical resistivity and corrosion resistance at increasing temperatures. Zircon-type refractories, while having high resistivity to electrical charging, have been found to be incompatible with certain glasses, such as C-glasses and are prone to high rates of erosion from such molten glass compositions. And, the utilization of refractories of higher erosion resistance such as chromic oxide refractories has not been found to be practical in some cases because the chromic oxide refractories have an electrical resistivity appreciably less than the resistivity of the molten glass at furnace operating temperatures. As a result, the chromic oxide refractory short circuits and current flows through the refractory, heating the refractory and thereby wearing the refractory excessively and sloughing the refractory into the molten glass. Thus corrective attempts to cool the chromic oxide refractories to avoid the short circuiting are evident, such as those shown in U.S. Pat. No. 4,491,951.

The present invention provides for a method and apparatus which improves upon these past efforts and achieves the following objectives.

It is an object of the present invention to provide a controlled electrical firing circuit to produce more thermally homogeneous glass.

It is an object of the present invention to reduce the level of stoning and cords in the glass melt due to refractory dissolution.

It is another object of the present invention to provide higher temperatures in the melter to produce lower seed counts.

It is another object of the present invention to provide for the high temperature melting of highly resistant glasses without corroding and short circuiting the refractory.

It is another object of the present invention to provide for the use of an erosion resistant, electrically conductive refractory without sacrificing the flexibility to use and melt highly resistant glasses.

SUMMARY OF THE INVENTION

The present invention will be described for use in the type of glass furnace disclosed in U.S. Pat. No. 4,528,013. It is not intended that the invention be limited in application to the specific furnace disclosed in U.S. Pat. No. 4,528,013 patent. It is intended that the present invention can be applied to all species and designs of electric glass melt furnaces. For the purposes of clarity in this disclosure the descriptions will be adapted to the design of U.S. Pat. No. 4,528,013 commonly referred to as a P-780 melter.

The P-780 melter is a refractory cold top melter which is integrally connected to the forming bushing. Powdered glass batch is continually spread on the surface of the molten glass by a spreading device. Thus, the batch maintains a cold top of powder (batch cover) which insulates the glass surface. The bottom side of the batch cover where the batch is slowly melting contains most of the batch reactions and degassing which generally occur.

The melter is coupled to the forming bushing which means it must deliver glass at a given viscosity to the inlet of the bushing. Generally this viscosity is log 2.8 which ranges in temperature from 2100° F. to 2300° F. In general, the melter runs several hundred degrees higher at the electrode plane than at the forming bushing. Thus the glass must be cooled to the proper temperature before it enters the bushing. Further the glass must be cooled uniformly throughout the cross section of the bushing block to provide stable operation. This temperature loss is usually achieved by the height of the electrodes above the bushing and cooling of the heated glass through the sides of the melter and bushing blocks. Usually the melter sidewalls are entirely water jacketed.

Achieving the required bushing temperature in a uniform manner has always been difficult to achieve. Often hot channels of glass are observed at the bushing which destroy bushing stability for long durations of time. During these instances a delta T across the bushing block cross section could vary up to 150° F.

The present invention provides a unique structure which effectively reduces this undesirable cross-sectional temperature gradient. A molybdenum flow block or flow distribution member receives the high temperature glass melt and channels the molten glass toward the forming apparatus or fiberizing bushing. Use of the molybdenum flow block homogenizes the glass temperature and provides for the further reduction of cords and stones at the critical point just above the bushing. Finally, use of a molybdenum flow block rather than a refractory flow block provides for higher corrosion resistance and reduced wear in a critical portion of the furnace.

A molybdenum heat sink or heat distribution plate of a corrugated pattern is positioned within the molybdenum flow block, around which the molten glass flows on its way to the bushing. This molybdenum heat distribution plate produces a cross-sectional thermal homogeneity above the bushing and provides for improved bushing performance. The heat distribution plate has been shown to greatly reduce horizontal temperature gradients within the flow block and above the bushing thereby improving the bushing performance on a low viscosity glass to an acceptable level.

The present invention provides for an improved joule effect glass melt furnace constructed basically of chromic oxide refractory. The interior walls of the melter have molybdenum plates fixed flush to the refractory. The molybdenum plates decreases the exposed refractory area, thereby reducing the dissolution, spauling and erosion of the refractory at high temperatures. The use of the molybdenum plates allows for higher melting temperatures producing lower seeds, stones and cords in the glass melt. The molybdenum liners are selectively placed on the walls and floor of the glass melt receptacle and are connected with the electrode firing circuit. The molybdenum electrodes are inserted through the refractory, preferably the side walls. The joule effect heating of the glass melt is provided by the electric charge transferring between the molybdenum electrodes and also to the molybdenum liner plates. This novel firing circuit is found to produce more thermally homogenous glass, and a more uniform temperature distribution throughout the pool of molten glass.

Finally, the present invention provides a unique electrical isolator system designed to protect the chromic oxide refractory when used with high resistivity glasses. For instance, when using chromic oxide refractory with E-type glass, the refractory is about ten times more conductive than the glass. Thus, there is a current flow through the refractory as well as the glass. A refractory electrical isolator composed of zircon or zirconia is placed so that the chrome refractory doesn't complete a circuit. This isolation causes the refractory current path to include several segments of cold glass in the corners of the melter. These aspects of the present invention will be better understood when described with the benefit of the accompanying drawings.

DETAILED DESCRIPTION OF THE DRAWINGS

Figure 1:
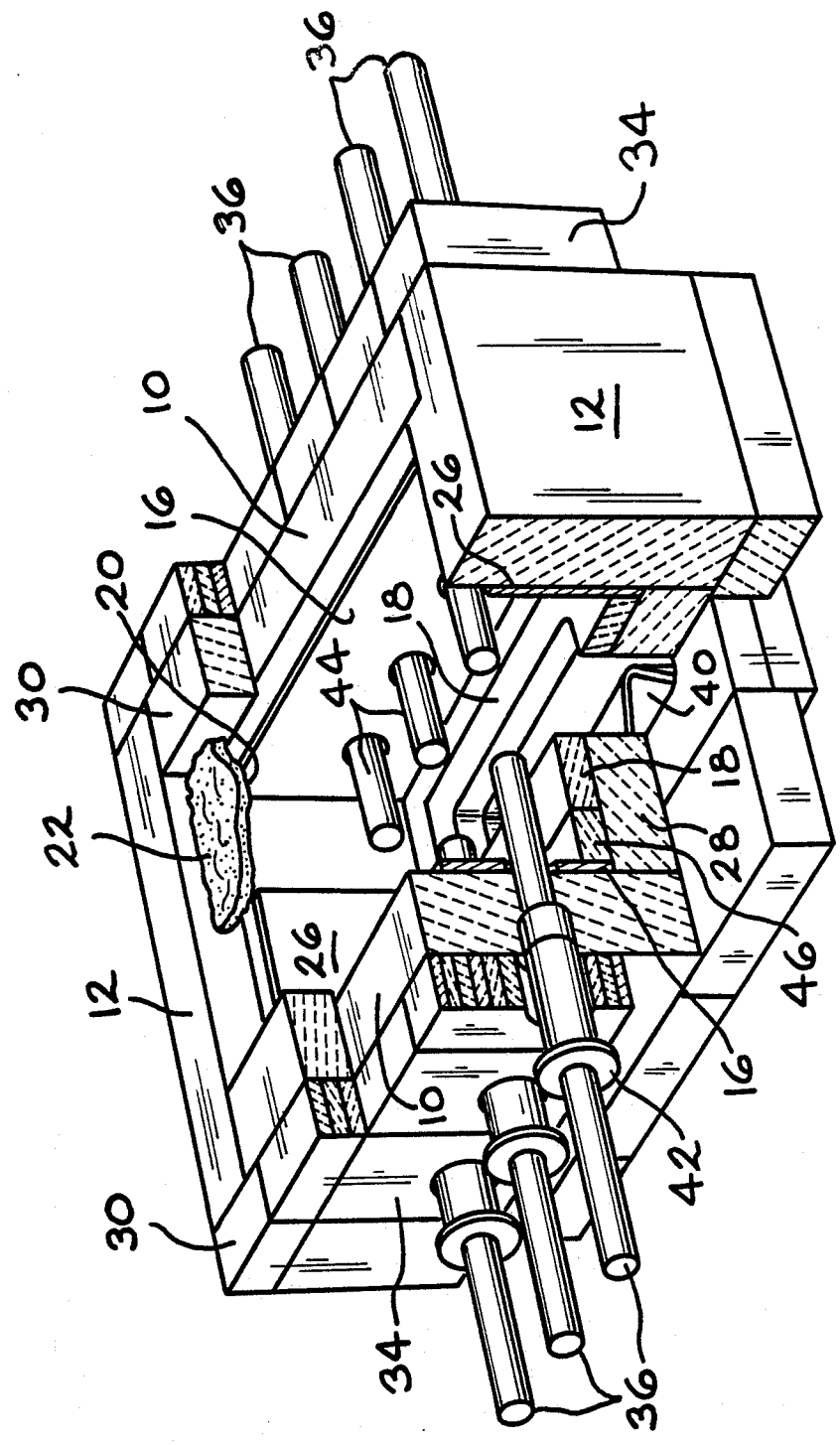
FIG. 1 is a perspective view of a refractory cold top melter incorporating the apparatus of the present invention and capable of performing the method of the present invention.
Figure 2:
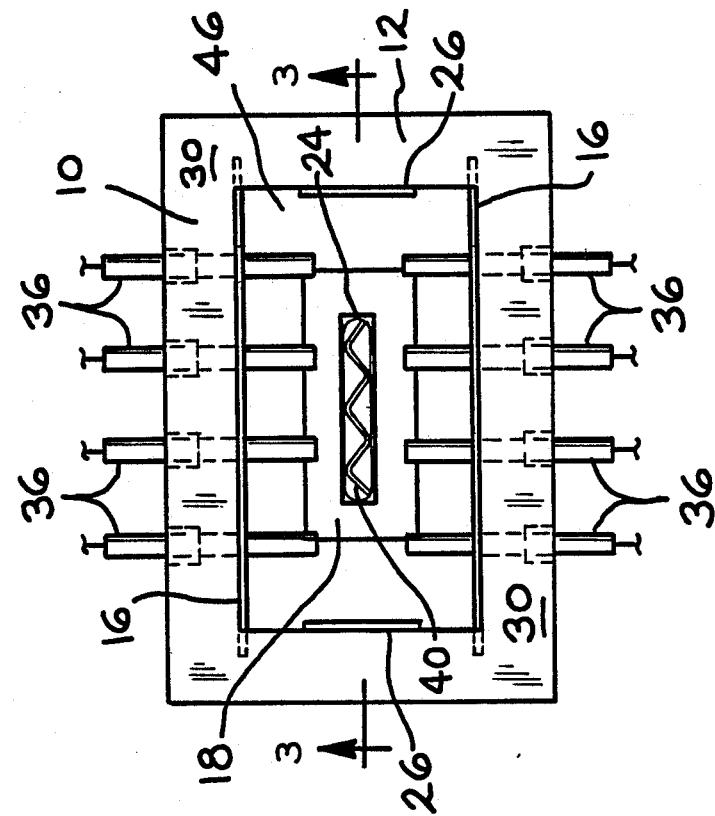
FIG. 2 is a plan view of the melter of the present invention capable of performing the method of the present invention.
Figure 3:
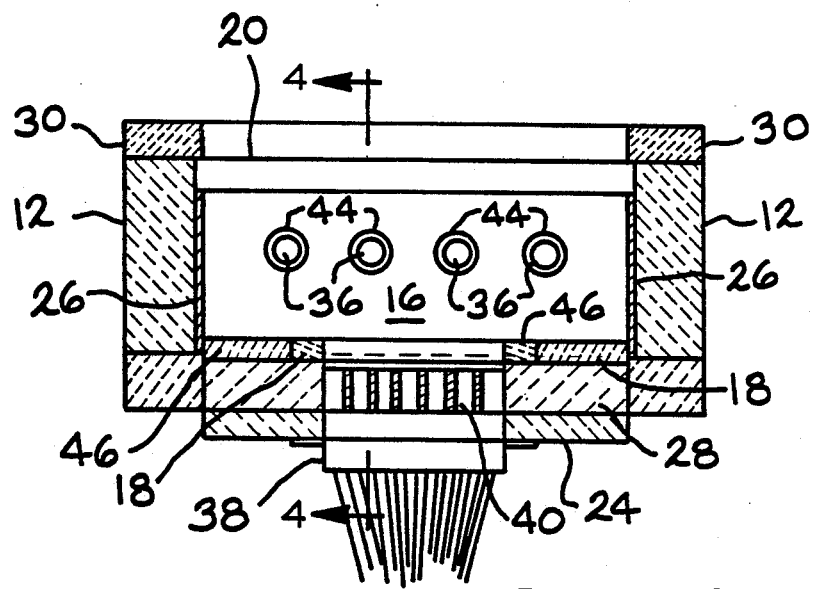
FIG. 3 is a cut-away view along plane 3—3 of FIG. 2.
Figure 4:
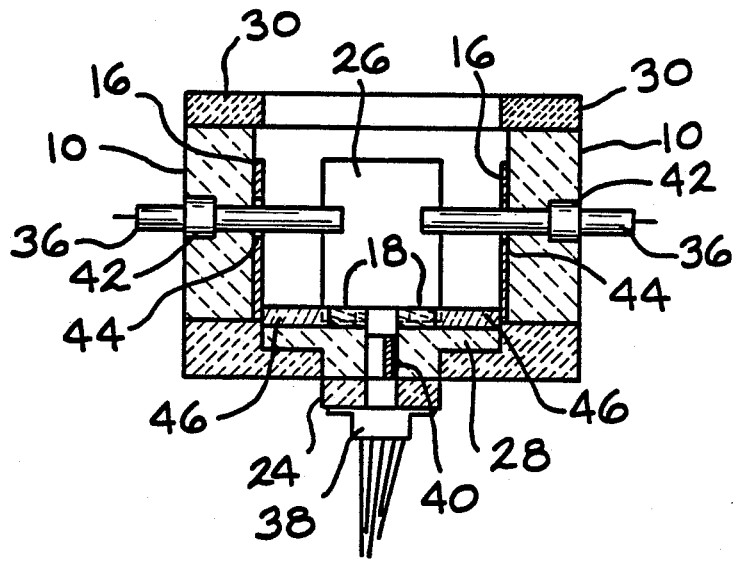
FIG. 4 is a cut-away view along plane 4—4 of FIG. 3.

The present invention provides for a refractory cold top melter which can be used to melt glasses of high resistivity to desirable temperatures while reducing seed, stones and cords in the glass melt without suffering the deleterious sloughing, flaking, short-circuiting and erosion of the refractory from which the melter is constructed. Further, the present invention provides for uniform cross-sectional temperatures of the molten glass as it enters a glass forming apparatus such as a bushing.

Referring now to FIGS. 1-4, the glass melter of the present invention will be described in detail. The melter is constructed to have refractory side walls 10, end walls 12 and a flow block 18. The side walls 10 are primarily constructed of chromic oxide refractory with the end walls 12 constructed of zirconia. Mounted in a flush position against the interior or the side walls 10 is ¼ to 1 inch thick molybdenum plating 16. The molybdenum side wall plating 16 extends fully between the end walls 12 and is positioned flush against the floor of the melter. The top of the molybdenum side wall plating 16 is positioned immediately below the batch crust/molten glass interface 20 for the powdered glass batch 22. The melter end walls 12 also have molybdenum end wall plates 26 mounted flush thereon. The molybdenum end wall plates 26 are placed along the centerline of the end walls 12. In the preferred embodiment, the molybdenum end wall plates 26 do not meet the side wall plates 16 but rather leave the refractory exposed.

The exposed refractory of the end wall 12 is constructed of a zircon or zirconia refractory which exhibits much higher resistivity to electrical current. The ziron refractory end walls 12 are is provided to eliminate unwanted current loss through the refractory. A cap 30 of bonded mullite covers the refractory around the perimeter of the melter.

The flow block 18 of the melter of the present invention is composed of molybdenum. The use of molybdenum as the material for the flow block provides a heat sink which assists in reducing the high temperature of the molten glass to a desired forming temperature and viscosity. However, the flow block 18 may be composed of chromic oxide refractory if the heat sink properties for which molybdenum is used are not required. The flow block 18 is insulated by zircon or zirconia refractory 46. Referring to FIG. 1, water jackets 34 which are optional in the design, are provided on the exterior of the refractory surrounding the electrodes 36 and the bushing block 24 of the melter.

The molybdenum flow block 18 has a thermal conductivity of 600 btu/(F inches) at 2000F and chromic oxide refractory is 10 btu/(F inches) at 2000F. Therefore, the molybdenum flow block 18 is very efficient as an isothermal heat sink. The flow block 18 absorbs heat at a rate approximately 60 times greater than the normal chromic oxide refractory flow block. Therefore, the molybdenum flow block 18 acts to normalize the glass temperatures on the melter floor and the glass entering the bushing 38 is more easily regulated.

Located within the refractory flow block 28 is a molybdenum heat distribution baffle 40. The heat distribution baffle 40 operates as an additional isothermal heat sink and generally equalizes any cross-sectional temperature gradients found in the glass flow through flow block 28. The baffle 40 facilitates the delivery of isothermal glass to the bushing 38. The molybdenum baffle 40, in reducing the temperature differentials of the glass being delivered to the bushing 38 improves the bushing 38 stability and eliminates unwanted seeds, stones and cords.

The electrodes 36 are of opposed polarity and are inserted through the side walls 10 and molybdenum side wall plates 16 into the glass melt. In the preferred embodiment, there are four sets of opposed electrodes (36A, B, C, D). The electrodes are water jacketed 42 to prevent unwanted oxidation. The molybdenum side wall plates 16 are spaced from the electrodes 36 by a gap 44 of approximately $\frac{3}{8}''$. Molten glass is present in this gap 44 and the molten glass prevents the direct transfer of a full electrical charge from the electrodes 36 to the molybdenum plating 16.

Figure 5:
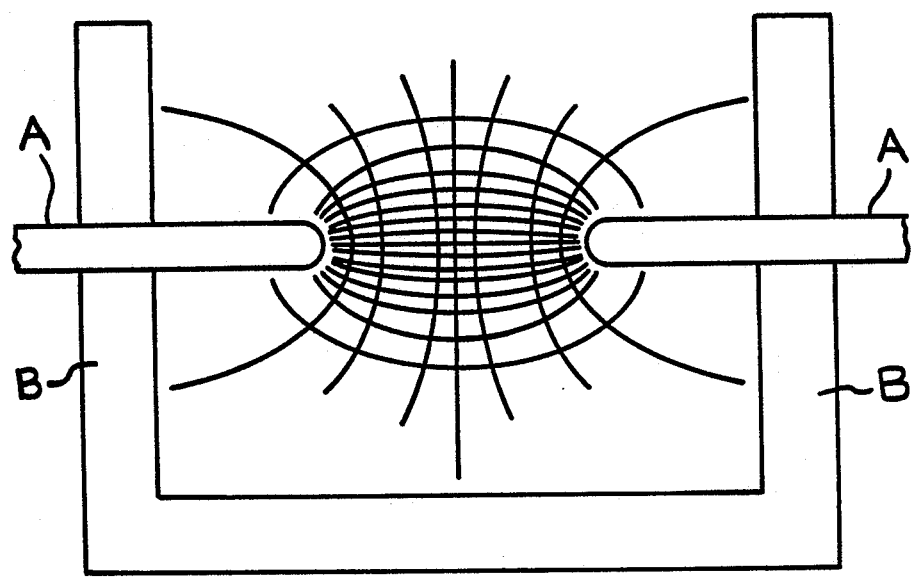
FIG. 5 is a cross-sectional view of the horizontal electrode plane showing current and potential flux with no conduction through the refractory.

Referring now to FIG. 5, the cross-section of the horizontal electrode plane of the melter of the present invention is shown in schematic. In FIG. 5, the current densities are represented by the lines running between the electrodes A. The current densities are highest for the shortest paths and the shortest paths indicate where the most energy is released. The energy release is proportional to the current squared times the resistance of the path. The lines generally perpendicular to the current lines are isopotential lines. Any point on the isopotential lines have the same voltage, with the highest voltage located between the electrodes A and reducing towards the refractory B of the melter. FIG. 5 discloses a symmetrical pattern which assumes that the top glass boundary is equidistant from the electrodes with the bottom refractory. Also, the patterns shown in FIG. 5 do not consider convection currents which occur during melter operations which would skew the pattern in an upward fashion. In true melting operations, the hotter glass rises, having a lower resistivity and the current follows that path, thereby skewing the lines on FIG. 5 in an upward direction.

Figure 6:
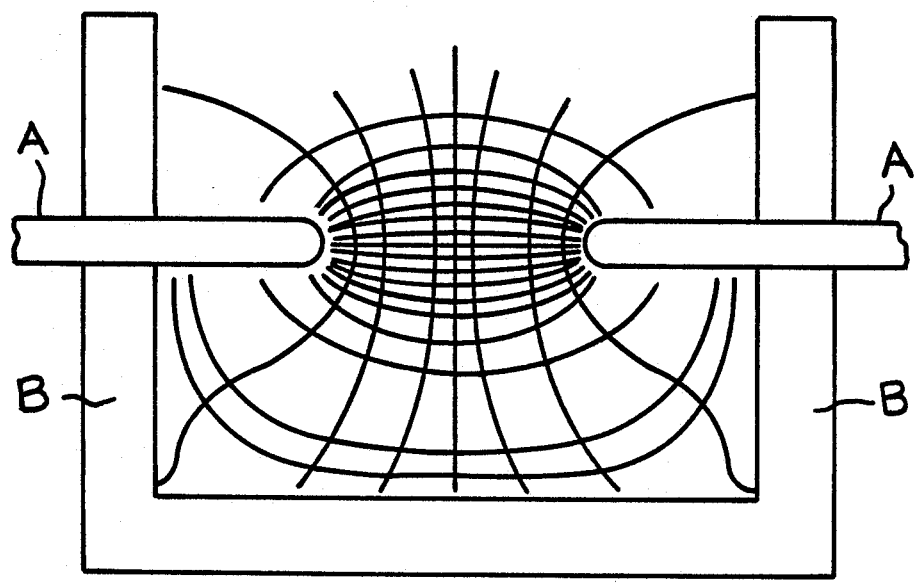
FIG. 6 is a view through the cross section of the horizontal electrode plane showing the current and potential flux with some conduction through the refractory in an ideal situation having no convection considerations.

Referring now to FIG. 6, there is shown an ideal case again having no convection considerations where some of the electrical current is conducting through the refractory B. In the case of FIG. 6, a high current density is flowing around the electrodes A and into the refractory B. This current density becomes less the further the current is from the electrodes A. If there was an ability to control the amount of current flowing to the refractory B as is provided by the present invention, the current distribution shown in FIG. 6 is preferable over that of FIG. 5 since the current is dissipated over a large volume of glass, thus imparting additional stability and isothermal conditions to the glass.

Figure 7:
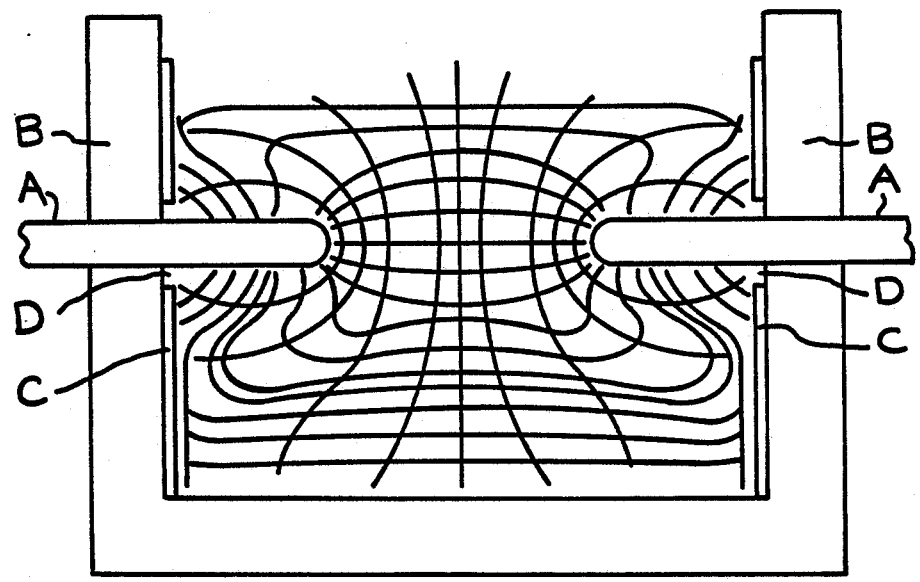
FIG. 7 is a cross-sectional view of the horizontal electrode plane of the melter of the present invention showing the current and potential flux patterns in the method of the present invention, having no convection considerations.

FIG. 7 shows the current and potential paths for a melter design of the present invention, having $\frac{1}{4}$ to 1 inch thick molybdenum side walls C. The current density flowing from the electrodes A to the molybdenum liner C is high. The surface of the molybdenum plate C is isopotential and charge is about 20% lower than that at the electrodes A. This reduction in charge is controlled by the larger diameter hole in the molybdenum liner C. This gap D forces the current to go through the glass before entering the liner C and results in the voltage drop. About 20% of the current then fires through the glass from the molybdenum liner C. An additional result of the charged molybdenum liner C is an overall reduction of the total electrode voltage. This reduction is a result of a reduction in the bulk resistivity which is reduced by the increase of the conducting surface area of molybdenum liner C with the glass. The chrome 20 (chromic oxide) refractory is considered the best corrosion refractory available. However, its ultimate melting point is 3200° F. In some instances, E-glass must be melted at 2900° F. to reduce the seeds in the glass. In prior art glass melt furnaces, using only chromic oxide refractory, the corrosion rate is unacceptably high and the glass is contaminated by the dissolved chrome. Applicant's invention wherein the molybdenum plates and zirconia isolators are primarily in communication with the glass reduces the amount of dissolved chrome in the glass. Therefore, it is apparent that the present invention combining molybdenum plate side walls with chromic oxide refractory and zirconia isolators functions to fully achieve the objectives of this invention as stated earlier.

The preceeding description of the preferred embodiment and drawings is not intended to be limiting in scope to the claims which follow.

We claim:
1. An improved method for melting glass comprising:
   providing a pool of molten glass in a melting furnace having bottom and side walls constructed of a refractory having a resistivity that decreases with increasing temperature and a metal liner positioned flush with such refractory at specified locations on such bottom and side walls;

electrically heating such molten glass by means of heating electrodes of opposed polarity immersed in such molten glass providing an electrical charge therebetween, such heating electrodes also providing an electrical charge to such metal liner about 20% less than such charge between such electrodes to encourage a uniform temperature distribution through said pool of glass;

flowing such heated glass past such electrodes into a forming apparatus for producing glass product.

2. The glass melting method of claim 1, further including the step of flowing such heated glass over a heat distribution means immediately prior to such glass being received by such forming apparatus.

3. The method of claim 1, wherein said heated glass flows into said forming apparatus underlying said pool of molten glass.

4. An electrically energized glass melting furnace comprising:

a melt unit having a floor and side walls for containing a pool of molten glass, said floor and side walls constructed of a refractory material and having a metal liner positioned flush on the interior surface of said refractory at specified locations on said walls;

a plurality of heating electrode immersed in such molten glass, said heating electrodes being of opposed polarity;

means for providing an electrical charge in a selected firing pattern between selected electrodes and said metal liner to encourage a uniform temperature distribution throughout said heated glass; and, flow distribution means for receiving said heated glass and supplying such heated glass to a forming apparatus for producing glass product.

5. The furnace of claim 4, wherein said metal liner is composed of molybdenum.

6. The furnace of claim 4, wherein said metal liner is inset into said refractory to provide a smooth surface continuum at the joint of said metal liner and said refractory.

7. The furnace of claim 4, wherein said refractory is composed of chromic oxide.

8. The furnace of claim 7, wherein said refractory further includes a series of zircon or zirconia insulator means positioned proximate said metal liner and said electrodes to provide isolation of said chromic oxide refractory against such electrical current.

9. The furnace of claim 4, wherein said flow distribution means is composed of molybdenum, whereby said flow distribution means draws heat from said heated glass to supply such glass to said forming apparatus at a preselected temperature and viscosity.

10. The furnace of claim 4, further including a heat distribution member within said flow distribution means whereby said heat distribution member reduces any cross-sectional temperature gradient in such heated glass as such glass flows to said forming apparatus.

11. The furnace of claim 26, wherein said heat distribution member is composed of molybdenum.

12. An electrically energized glass melting furnace comprising:

a molten glass receptable having side walls and a floor composed of chromic oxide refractory;

molybdenum liner members positioned flush on the interior surface of said chromic oxide refractory at specified locations;

a plurality of molybdenum electrodes immersed in such molten glass proximate said molybdenum liner members, whereby electrical current charges between said electrodes and also to said liner in a specified charge pattern to heat said molten glass;

means for controlling the firing pattern of said plurality of electrodes; and, a molybdenum flow distribution member for supplying such heated glass to a fiberizing bushing.

13. The furnace of claim 12, further including a heat distribution member positioned proximate said flow distribution member.

14. An improved melt furnace for the joule effect heating of raw glass particulate comprising, in combination:

a melting furnace having a bottom and side walls composed of chromic oxide refractory and having molybdenum liner members inset in said refractory at specified locations, said joint between said liner and said refractory providing a smooth surface continuum on the interior of said furnace;

a plurality of electrodes extending through said side walls of said furnace at selected locations, said electrodes of opposed polarity;

means for providing an electrical charge to said electrodes in a specified firing pattern whereby joule effect current flows between said electrodes and also to said molybdenum liner members;

a molybdenum flow distribution member positioned in such bottom of said furnace for receiving heated glass and supplying such glass at a predetermined temperature and viscosity to a forming apparatus for fiberizing such glass; and, a molybdenum heat distribution member positioned within said flow distribution member to reduce cross-sectional temperature gradients within said heated glass flow.

15. The melt furnace of claim 14 wherein said refractory is further composed of zircon or zirconia inserts located at positions proximate said liner and electrode members, said inserts for insulating said chromic oxide refractory from receiving excessive joule effect currents.

16. An improved method for melting glass comprising the steps of:

heating molten glass in a refractory lined furnace by means of joule effect electrodes immersed in such molten glass;

continually supplying raw glass material to the surface of such molten glass in such refractory lined furnace;

flowing such heated glass through a molybdenum throat of high resistivity to a glass forming apparatus, such molybdenum throat drawing heat from such glass to deliver such glass to such forming apparatus at a predetermined temperature and viscosity.

17. The method of claim 16, further including the step of flowing such heated glass over a metal heat distribution means positioned in such throat to reduce any cross-sectional temperature gradient in such glass flowing to such forming apparatus.

18. An improved method for the joule effect heating of glass comprising the steps of:

providing a pool of molten glass contained in a refractory lined melt furnace;

supplying raw glass material to the surface of such pool;

heating such pool of molten glass by means of electrodes immersed in such pool to a preselected temperature;

flowing such heated glass to a glass forming apparatus over a metal heat distribution means to reduce any cross-sectional temperature gradient in such glass prior to receipt by such forming apparatus.

19. An improved method of forming glass product from raw batch glass comprising the steps of:

providing a pool of molten glass in a melt furnace having a bottom and side walls constructed of a refractory and molybdenum liner;

supplying raw glass batch material to the surface of such pool;

heating such pool of molten glass to a preselected temperature by means of electrodes immersed in such molten glass whereby joule effect electrical current flows between such electrodes and to such molybdenum liner;

flowing such heated glass through a molybdenum throat and over a molybdenum heat distribution means to cool such heated glass to a preselected temperature and viscosity and reduce any cross-sectional temperature gradients and supply such glass to a glass forming apparatus.

20. An improved apparatus for heating molten glass comprising:

a refractory lined furnace containing a pool of molten glass;

a plurality of electrodes immersed in such molten glass;

means for supplying raw batch glass to the surface of said pool of such molten glass; and, a metal flow delivery means for receiving heated glass flowing from such pool and delivering such glass to a forming apparatus, wherein said flow delivery means draws heat from such heated glass to a preselected temperature to deliver such glass to such forming apparatus at a desired viscosity.

21. The apparatus of claim 20, further including a metal heat distribution member positioned proximate said flow delivery means for reducing any cross-sectional temperature gradient in such glass being delivered to such forming apparatus.

22. An improved apparatus for the joule effect heating of glass, comprising:

a pool of molten glass contained in a refractory lined melt furnace;

means for supplying raw glass material to the surface of such pool;

a plurality of electrodes immersed in said pool for heating said pool to a preselected temperature; and, a metal heat distribution means for receiving such heated glass and flowing such heated glass to a glass forming apparatus at a reduced cross-sectional temperature gradient.

23. An improved apparatus for forming glass products from raw batch glass comprising, in combination:

a melt furnace having a bottom and side walls constructed of refractory and a molybdenum liner containing a pool of molten glass;

means for supplying raw glass batch material to the surface of such pool;

a plurality of electrodes immersed in such pool for heating such glass to a preselected temperature by joule effect electrical current between said electrodes and also to said molybdenum liner;

a molybdenum flow distribution member for cooling such heated glass to a preselected temperature and viscosity and delivering such cooled glass to a glass forming apparatus; and, a molybdenum heat distribution member within said flow distribution member to reduce any cross-sectional temperature gradient prior to delivery of such glass to such glass forming apparatus.

24. An improved method for melting glass comprising:

providing a pool of molten glass in a melting furnace having bottom and side walls constructed of a refractory having a resistivity that decreases with increased temperature and a metal liner positioned on such refractory at specified locations on such bottom and side walls;

electrically heating such molten glass by means of heating electrodes of opposed polarity immersed in such molten glass, such heating electrodes also providing an electrical charge to such metal liner to encourage a uniform temperature distribution through said pool of glass; and, flowing such heated glass past such electrodes and over a heat distribution means into a forming apparatus for producing glass product.

25. An electrically energized glass melt furnace comprising:

a melt unit having a floor and side walls for containing a pool of molten glass, said floor and side walls constructed of a refractory material and having a metal liner positioned flush on the interior surface of said refractory at specified locations on said walls;

a plurality of heating electrodes immersed in such molten glass, said heating electrodes being of opposed polarity;

means for providing an electrical charge to said heating electrodes whereby current travels through said molten glass between selected electrodes and also to said metal liner to encourage a uniform temperature distribution throughout said heated glass; and, flow distribution means composed of molybdenum for receiving said heated glass and drawing heat from said heated glass to supply such glass to said forming apparatus at a preselected temperature and viscosity.

26. An electrically energized glass melting furnace comprising:

a melt unit having a floor and side walls for containing a pool of molten glass, said floor and side walls constructed of a refractory material and having a metal liner positioned flush on the interior surface of said refractory at specified locations on said walls;

a plurality of heating electrodes immersed in such molten glass, said heating electrodes being of opposed polarity;

means for providing an electrical charge to said heating electrodes whereby current travels through said molten glass between selected electrodes and also to said metal liner to encourage a uniform temperature distribution throughout said heated glass; and, flow distribution means for receiving such heated glass and supplying such heated glass to a forming apparatus for producing glass product, said flow distribution means including a heat distribution member within said flow distribution means, whereby said heat distribution members reduces any cross-sectional temperature gradient in such heated glass as such glass flows to such forming apparatus.

27. An improved method for melting glass comprising the steps of:

heating molten glass in a refractory lined furnace by means of joule effect electrodes immersed in such molten glass;

continually supplying raw glass material to the surface of such molten glass in such refractory lined furnace;

flowing such heated glass through a metal throat of high resistivity and over a metal heat distribution means positioned in such throat to draw heat from such glass and reduce any cross-sectional temperature gradient in such glass; and, delivering such glass to a forming apparatus at a predetermined temperature and viscosity.

* * * * *